Sept. 30, 1969   R. M. VAILLANCOURT   3,470,345
AIR ACCESSORY FOR CONVERTING ARC WELDER TO CUTTER
Filed June 12, 1967
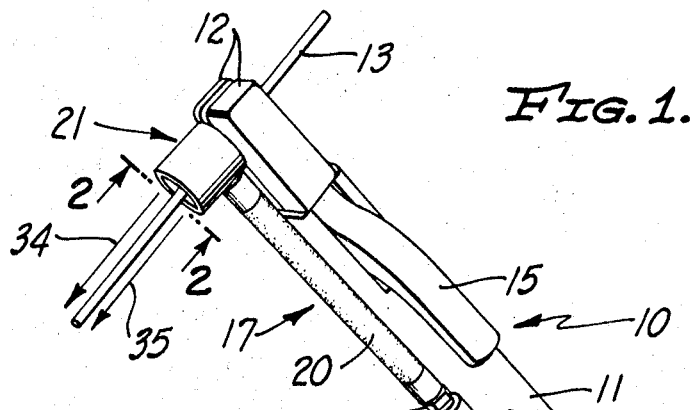
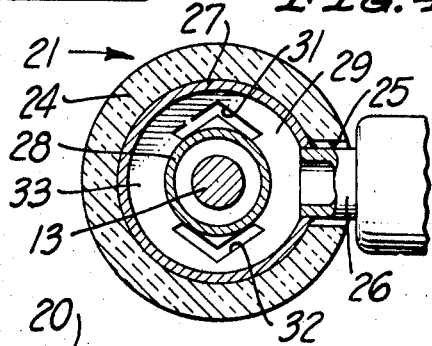
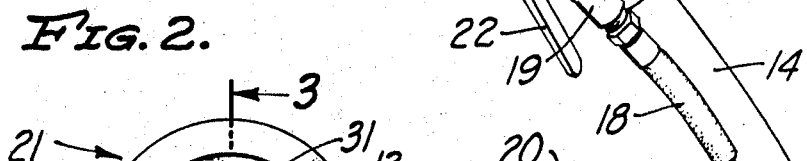
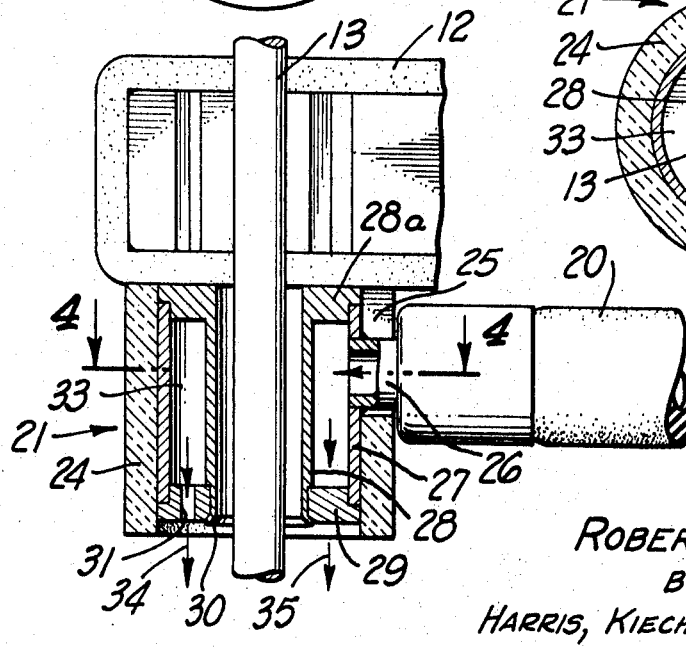
INVENTOR
ROBERT M. VAILLANCOURT
BY HIS ATTORNEYS
HARRIS, KIECH, RUSSELL & KERN

United States Patent Office 3,470,345
Patented Sept. 30, 1969

3,470,345
AIR ACCESSORY FOR CONVERTING ARC WELDER TO CUTTER
Robert M. Vaillancourt, Pasadena, Calif., assignor to Thermacote Company, Pasadena, Calif., a corporation of California
Filed June 12, 1967, Ser. No. 645,154
Int. Cl. B23k 9/00
U.S. Cl. 219—70                                    1 Claim

ABSTRACT OF THE DISCLOSURE

An accessory for a conventional electric arc welder, for directing a stream or streams of air along the electrode of the welder towards the arc thereof to remove molten metal removed by the electrode arc and to cool the electrode.

---

This invention is an accessory for a conventional electric arc welder, adapted to be joined to and used with such a welder to direct a stream or streams of gas, such as air, along the electrode of the welder to remove molten metal cut from the work during operation of the welder and to cool the electrode, so that such welder may be employed for the cutting, piercing, gouging, and bevelling of a metal workpiece.

It is conventional in the art to provide a unitary combination tool for retaining a cylindrical electrode, supplying the electrode with electric current, and simultaneously supplying air to the head of the tool and directing it along the electrode to remove molten metal cut from the work by an electric arc from the electrode. Such a device is illustrated in the patent to Stepath et al. No. 2,706,236. Most of such devices are complex and expensive.

A primary object of this invention is to provide a simple and inexpensive accessory for use with a conventional electric arc welder, which will permit the use of such welder for the cutting, piercing, gouging, and bevelling of a metal workpiece as desired, but easily detachable from the welder to permit the latter to be used independently in its conventional manner. Many small welding shops possess such a conventional arc welder but cannot afford a separate conventional combination tool to be used exclusively for such cutting, piercing, gouging, or bevelling. The present invention quickly and cheaply converts the conventional arc welder to a dual purpose tool.

Referring to the drawing, which is for the purpose of illustration only:

FIG. 1 is a perspective view of this invention coupled with a conventional electric arc welder;

FIG. 2 is an enlarged, fragmentary end view, taken on the line 2—2 of FIG. 1;

FIG. 3 is a longitudinal view, partly in section, taken on the line 3—3 of FIG. 2; and FIG. 4 is a cross-sectional view taken on the line 4—4 of FIG. 3.

Referring to the drawing, FIG. 1 shows a conventional hand-held electric arc welder 10, having a body 11 provided with jaws 12 for clamping and holding a conventional cylindrical electrode 13, the electrode being supplied with electric current through an electric cable 14, the supply of current being controlled by a conventional switch (not shown) in the body 11 and adapted to be actuated by an external trigger 15 disposed generally parallel to the body and manually actuable by a finger of the operator.

As shown in FIG. 1, associated with the arc welder 10 is an accessory 17, generally consisting of an air supply 18, adapted to be connected to a source of air under pressure (not shown), such as a conventional air compressor, an air valve 19, a forward air hose 20, and an air head 21. The air valve 19 is a conventional valve adapted to control the supply of air from the main air hose 18 to the forward air hose 20 and air head 21, and is adapted to be operated manually by an external valve lever 22.

As best shown in FIGS. 2, 3, and 4, the air head 21 includes an outer tubular shell 24, preferably formed of heat and electrical insulating material such as red fiber, and having a U-shaped slot 25 adapted to fit over a nipple 26 of the forward air hose 20. Within the shell 24 is a tubular sleeve 27, welded or otherwise secured to the nipple 26. Also within the shell 24 is a tubular stem 28, having at one end an annular flange 28a which seats on one end of the sleeve 27. Also within the shell 24 is an annular wafer 29 which seats on the other end of the sleeve 27, and the free end 30 of the stem 28 is crimped thereover to draw the flange 28a and wafer 29 against the ends of the sleeve 27 to form an air-tight seal therewith and to retain the parts assembled as shown in FIG. 3. The wafer 29 is provided with a pair of air slots 31 and 32, which are V-shaped and are diametrically located on each side of the longitudinal axis of the air head 21. The air slots 31 and 32 communicate with an annular air chamber 33 between the sleeve 27 and stem 28 and which is adapted to be supplied by air through the nipple 26.

In assembling the accessory 17 with the arc welder 10 for operation, the cable 14 is connected to a conventional source of electrical current and the air supply hose 18 is connected to a conventional source of air under pressure, preferably such as to supply compressed air to the hose at a pressure of about 80 p.s.i.g. The air valve 19 is normally closed to prevent the passage of air to the air head 21 and the electric switch of the arc welder 10 is normally open to prevent the passage of current to the electrode 13. The air head 21 is then freely slipped longitudinally over the electrode 13 to the position illustrated in FIGS. 1 and 3 in which the top of the air head is flush with the bottom of the jaws 12, and the forward air hose 20 and air valve 19 are adjacent to and generally parallel with the body 11 of the arc welder. When so assembled, the arc welder 10 and accessory 17 are gripped together by the hands of the operator with the trigger 15 and valve lever 22 convenient to the fingers of the operator for actuation thereby. The operator then depresses the trigger 15 and the valve lever 22 to close the electric switch in the body 11 and open the air valve 19, to connect the source of electric current to the electrode 13 and to permit compressed air to pass into the air chamber 33 and therefrom through the V-shaped air slits 31 and 32 in two streams, generally indicated by the arrows 34 and 35, along two diametrically located sides of the electrode 13. Each of such streams of air is V-shaped as it emerges from its air slit, but as such streams pass along the electrode 13 they tend toward a semicylindrical form and merge together to form a single generally cylindrical stream of air at the lower end of the electrode. The assembly is then positioned by the operator so that the lower end of the electrode is adjacent to a metal workpiece to be cut, pierced, gouged, or bevelled by the electric arc therefrom, and this operation is carried out conventionally, the resulting molten metal being blown away from the workpiece by the stream of air supplied from the air head 21. By this construction, the entire flow of air is concentrated at the electric arc, permitting the operator to better control the elimination of molten metal resulting from the arc to increase the safety factor to the operator. The shape of the air streams emerging from the air slots 31 and 32 causes air turbulence around the electrode 13 which assists in cooling the electrode and keeping it relatively cool, thus increasing its usable life. Upon release of the trigger 15 the supply of electric current to the electrode 13 is shut-off, to stop the electric arc, although the air valve 19 may be held open for a few seconds thereafter to cool the electrode to a temperature at which it may be handled comfortably, following which the valve lever 22 may be released to stop the flow of air to the air head 21.

I do not intend to be limited to the specific embodiment described hereinabove, but desire to be afforded the full scope of the following claim:

1. An accessory for a hand-held arc welder having means for retaining a welding rod adjacent one end of the welder and at an angle thereto, means for supplying an electric current to the electrode, and a trigger switch adjacent the other end of the welder for controlling said current, including:

an air valve for controlling a supply of air and having an external manually operable control lever;
means for supplying air to said air valve;
an air conduit for conveying air from said air valve; and
a tubular air head adapted to slidably fit over said electrode and connected to said conduit to receive air therefrom and to direct a flow of air along the electrode towards the free end thereof, said air head having a pair of V-shaped air discharge orifices diametrically disposed on each side of the electrode and dividing the flow of air therealong into two substantially V-shaped streams which substantially converge at said free end to remove free metal resulting from the operation of the electrode and to cool the electrode, the air head including an outer cylindrical shell formed of insulating material, tubular stem means within said shell and providing an annular air chamber inside of said shell, said stem having a central longitudinal bore adapted to be slipped over such an electrode, said stem having said V-shaped orifices in the bottom thereof, said streams merging to form a single generally cylindrical stream of air at said free end.

References Cited

UNITED STATES PATENTS

| | | | |
|---|---|---|---|
| 1,324,337 | 12/1919 | Chapman et al. | 219—70 |
| 1,436,557 | 11/1922 | Wysong | 219—70 |
| 2,465,157 | 3/1949 | Isbell | 219—70 |
| 2,726,309 | 12/1955 | Stepath | 219—70 |

JOSEPH V. TRUHE, Primary Examiner

R. F. STAUBLY, Assistant Examiner